(No Model.)
H. MARNEFFE.
VEHICLE BRAKE AND STARTER.
No. 277,308. Patented May 8, 1883.
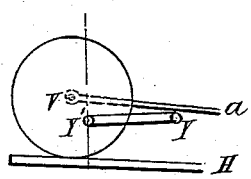
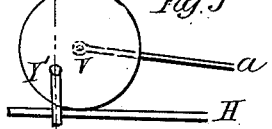
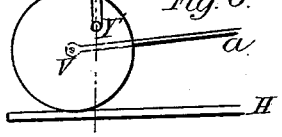
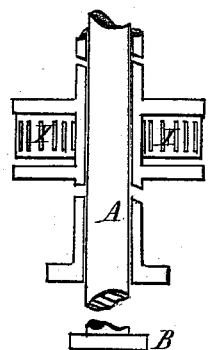
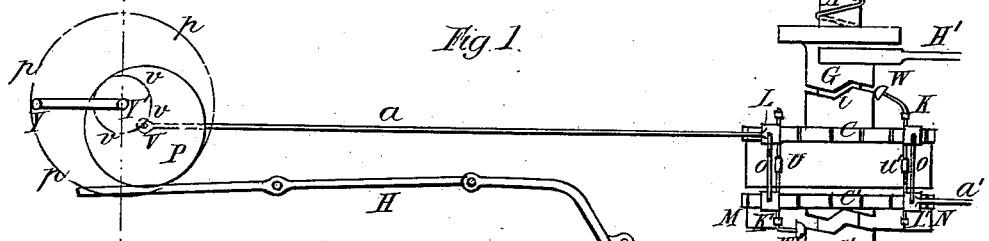
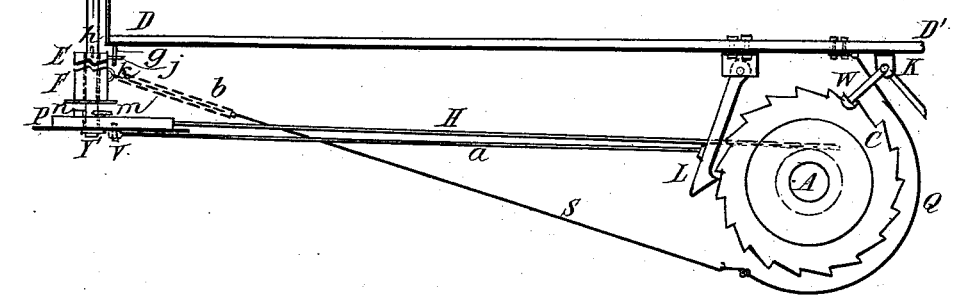
Witnesses.
Vinton Coombs
Robert Everett
Inventor.
Henri Marneffe,
By James L. Norris.
Atty

UNITED STATES PATENT OFFICE.

HENRI MARNEFFE, OF LIEGE, BELGIUM.

VEHICLE BRAKE AND STARTER.

SPECIFICATION forming part of Letters Patent No. 277,308, dated May 8, 1883.

Application filed March 7, 1883. (No model.) Patented in Belgium January 11, 1882, No. 56,739, and in England February 1, 1883, No. 564.

*To all whom it may concern:*

Be it known that I, HENRI MARNEFFE, of Liege, in the Kingdom of Belgium, have invented new and useful Improvements in Brake Apparatus for Tramway or other Vehicles, which apparatus also serves to assist in starting or propelling the same, (for which I have obtained a patent in Great Britain, No. 564, bearing date February 1, 1883, and a patent in Belgium, No. 56,739, bearing date January 11, 1882,) of which the following is a specification, reference being had to the accompanying drawings.

The chief object of this invention is to store the energy or momentum of vehicles when being brought to a stand-still, so that it can be utilized at any time when an extra supply of power is required.

The brake apparatus or mechanism comprised in this invention can be fitted to vehicles intended to be driven in either direction, such as tramway-cars. It also obviates the necessity for providing different brakes, one to be used when going forward and the other when traveling backward, the brake being arranged to operate in both directions. The brake mechanism is arranged beneath the flooring of the vehicles.

According to the said invention, I employ as a brake a spiral spring coiled in a box fitted to the axle of the vehicle, by which it is coiled. This spring is uncoiled at will, either at the moment of starting or at any other time—say when running up a gradient. The two ends of the carriage being symmetrical, I shall describe the brake mechanism as attached at one end of the carriage only.

In the accompanying drawings, Figure 1 is a plan, and Fig. 2 is a side view, of mechanism constructed according to this invention. Fig. 3 is a horizontal section of the axle and spring-spiral. Figs. 4, 5, and 6 are detail views hereinafter described.

Similar letters of reference indicate corresponding parts throughout the drawings.

A is the axle of the vehicle.

D D' is the floor.

B B' are two rings, fixed to the axle, which rings maintain at a given degree of tension the two spiral metallic springs I I'. These rings are preferably made of steel, and are fixed by means of screws, whereby I can strengthen or weaken at will the action of the springs I I'.

C C' are two ratchet-wheels, which run loosely upon the axle and can be engaged with the two clutches G G'. These clutches are constructed to slide upon the axle A and to engage with the naves of the said ratchet-wheels in such a manner as to impart to them the motion of the axle. The inclination of the teeth *i* of these clutches is so arranged as to allow them to slip automatically over the corresponding teeth on the naves of the ratchet-wheels under a given degree of tension, which is the maximum strain of the spiral spring X. The springs I I' serve the purpose of forcing the clutches G and G' toward the ratchet-wheels K'.

L are the pawls of the ratchet-wheels, and act conjointly when stopping the vehicle, but separately when starting. The pawl L is controlled directly by a rod, *a*, and is connected with the pawl K' by means of a rod, O, in such a manner that when the rod *a* moves back it will leave the pawl K' in its place. These two pawls are linked together by a socket, U, which, however, does not interfere with their moving independently of each other. W' is a check-weight for restoring the pawl K' to its normal position when the spring X is relaxed.

P is a plate revolving eccentrically upon its axis Y' and describing a circle, *p p p*. In revolving, this plate imparts a backward and forward motion to the lever H.

V is a pivot fixed to the center of the plate P and describing a circle, *v v v*, round the axis Y'. By means of the rod *a* this pivot controls the pawls of the ratchet-wheels.

The spiral spring X is fixed at one end to the ratchet-wheel C and at the other end to the ratchet-wheel C'.

Q is a band or block acting as a brake, according to the direction of the vehicle's run, first upon the spring-box containing the spring X, and then upon a drum, M N, which forms a portion of the ratchet-wheel C'.

Y' is a shaft controlled by means of a handle, Y, by the guard of the vehicle. This handle can be removed and fitted to either one or the other end of the carriage.

E F are two clutches arranged on the shaft

Y'. The clutch E engages with the clutch F when the shaft Y' is rotated in one direction and slips over it when the said shaft is rotated in the opposite direction. The shaft Y' runs through these two clutches, and the feather $h$ causes the clutch E to turn round with the said shaft.

$j$ is a stud riveted to the clutch E, and $g$ is a stud fixed to the flooring D D' of the carriage. The clutch E cannot make more than one revolution, as it is checked by the stud $j$, which catches against the stud $g$.

$k$ is a ring or eye fixed to the lower clutch, F. To this ring are attached a chain, $b$, and a rod, S, connected with the brake Q.

$m$ $n$ are two fixed studs, the former of which is attached to the shaft Y', and the other, $n$, to the eccentric plate, P. The shaft Y' can turn in the plate P without moving it. By means of this arrangement, if the shaft Y' be turned in one direction, it will act upon the brake Q during an entire revolution (as the chain $b$ coils round the clutch F) without acting on the eccentric P. If the said shaft be turned in the other direction, it will act on the spiral-spring brake. Thus the stoppage of a vehicle can in case of need be effected with great rapidity by causing the two brakes to act simultaneously, it being only necessary for this purpose to give a quarter of a turn to the eccentric P, (the spring then acting as a brake,) and then to turn the shaft Y' in the opposite direction in order to act upon the brake Q.

The operation of the apparatus will be better understood by reference to Figs. 1, 4, 5, and 6, which show the four positions of the eccentric or plate P.

Fig. 4 shows the position of the said plate while the vehicle is running. The pawls K' and L are then raised out of contact with the ratchet-wheels, and the clutches G and G' are engaged with the said ratchet-wheel C', which then turns with the axle A. Fig. 5 shows the position of the said plate when the vehicle is being stopped. The pawls then drop and engage with the ratchet-teeth. The apparatus then forms a brake. The clutches are also in gear, while the spring X, coiled by the ratchet-wheels, stands at tension-point. Fig. 1 represents the position of the plate when the energy is stored up. The clutches are then out of gear and the pawls in engagement with the ratchet-teeth. Fig. 6 shows the position of the plate when the energy stored up has been expended. The apparatus is then thrown out of gear and disengaged, with the exception of the pawl K', which does not disengage from the ratchet-wheel C' until acted upon by the check-weight W', when the spring is quite relaxed.

What I claim is—

1. The spiral spring for effecting such storage of force or energy, the said spring being controlled by and having its extremities fixed to two ratchet-wheels, C C', in such a manner that it will be coiled or uncoiled, according as one or the other of the said ratchet-wheels operates, the tension of the said spring being capable of regulation by means of the rings B B' upon the axle A, substantially as set forth.

2. The combination of the axle A, the ratchet-wheels C C', the spiral spring X, having its ends secured, respectively, to the two wheels, the clutches G G', arranged to slide on the axle, the spiral springs I I', the pawls K' and L, the rod $a$, the eccentric P, and shaft Y', said parts being arranged to operate substantially as described.

3. The combination of the axle A, the ratchet-wheels C C', the coiled spring X, having its ends secured, respectively, to said wheels, the clutches G G', the spiral springs I I', the pawls K' and L, the rod $a$, the eccentric P, the shaft Y', the clutches E and F on the shaft, the rod S, connected with the clutch E, and the brake-band Q, connected with said rod, substantially as described.

In testimony whereof I have hereunto signed my name in the presence of two subscribing witnesses.

H. MARNEFFE.

Witnesses:
 ALFRED MARNEFFE,
 R. POWER.